Feb. 9, 1926. 1,572,597
W. E. DUNSTON
BUMPER ATTACHING AND SUPPORTING MEANS
Filed May 8, 1923
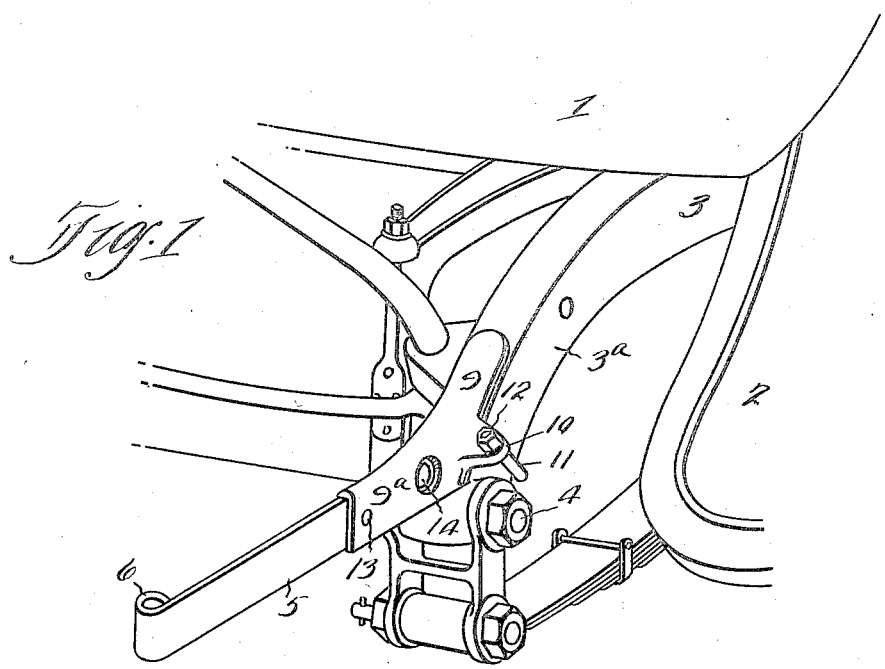
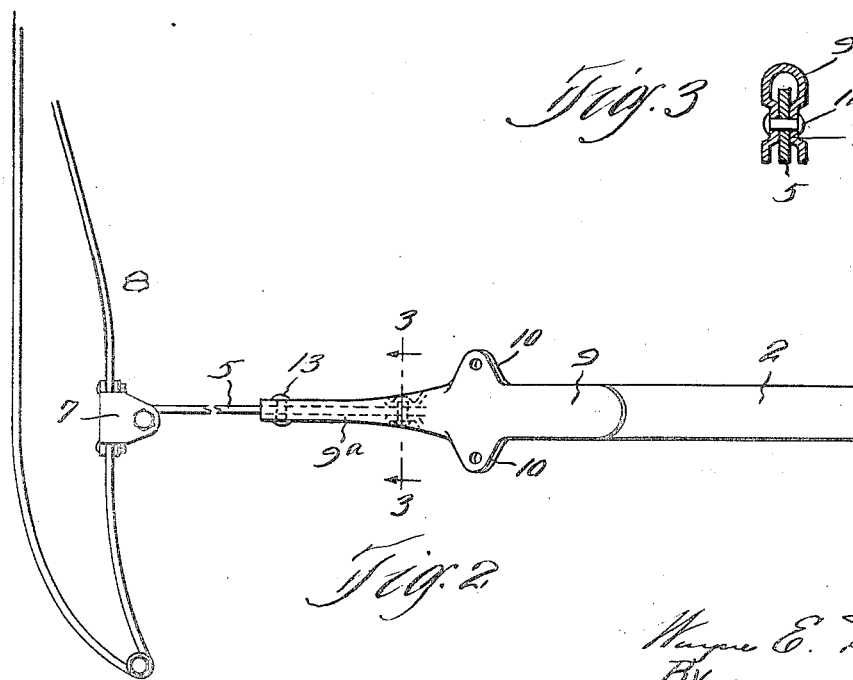
Inventor
Wayne E. Dunston
By Hull, Brock & West
Attys.

Patented Feb. 9, 1926.                                                   1,572,597

UNITED STATES PATENT OFFICE.

WAYNE E. DUNSTON, OF DETROIT, MICHIGAN, ASSIGNOR TO THE C. G. SPRING & BUMPER COMPANY, OF DETROIT, MICHIGAN, A CORPORATION OF DELAWARE.

BUMPER ATTACHING AND SUPPORTING MEANS.

Application filed May 8, 1923.   Serial No. 637,468.

*To all whom it may concern:*

Be it known that I, WAYNE E. DUNSTON, a citizen of the United States, residing at Detroit, in the county of Wayne and State of Michigan, have invented a certain new and useful Improvement in Bumper Attaching and Supporting Means, of which the following is a full, clear, and exact description, reference being had to the accompanying drawings.

This invention relates to means for supporting bumpers from the frames of automobiles, and more particularly to the means for accomplishing this object in connection with special shapes of side frame members of such vehicles.

It is the general object of the invention to provide bumper-supporting means which may be conveniently applied to the exposed curved ends of such side frame members and which, when so applied will support the said bumpers in an efficient manner and will enable the shocks due to impact to be effectively received and distributed to the appropriate vehicle frame members.

I accomplish the foregoing objects in and through the construction and arrangement of parts illustrated in the drawings, wherein Fig. 1 represents a detail in perspective of the rear end of an automobile having my invention applied thereto; Fig. 2 a detail in plan of certain of the parts shown in the preceding view and illustrating the manner of supporting a bumper from such parts; and Fig. 3 a sectional detail corresponding to the line 3—3 of Fig. 2.

Describing the various parts herein by reference characters, 1 denotes generally the rear end of an automobile having the fender 2 and side members 3, the rear ends of the members being downwardly curved, as indicated at 3ª, and forming spring horns or hangers adapted to receive the spring suspension bolts, one of which is indicated at 4.

5 denotes a bumper-supporting arm carried by each of the side frame members, the said arm being preferably of flat springplate material and having at its rear or outer end an eye 6 to which the bumper may be secured in any convenient manner, as by means of a clamp, indicated at 7, the clamp being adjustably connected to the bumper 8 in any approved manner.

In order to secure an effective mounting for each of the arms 5 upon its side frame member 3, a special bracket is provided, said bracket having a curved base plate 9 which is adapted to fit against the downwardly and rearwardly projecting end of the side frame member, said bracket being provided with a pair of opposed ears 10, extending beyond the inner and outer edges of the side frame member, the said ears being adapted to receive the upper ends of a U-bolt 11 extending beneath the side frame member and through said ears, each bracket being clamped to its side frame member by setting up the nuts 12. Each bracket is provided with a longitudinal extension 9ª which is of inverted U-shape in cross section, forming a downwardly facing slot for the reception of the front or inner end of the arm 5. The arm is secured in place by means of a rivet 13 and a rivet 14. Adjacent to the base plate 9, where the inverted U-shaped seat is widened, the opposite sides of the extension 9ª are pressed inwardly so as to contact with the arm 5, as shown at 14ª, forming countersunk seats for the rivet heads.

By the employment of brackets and arms such as shown and described herein, a bumper may be quickly and conveniently applied to the ends of the side frame members of substantially the contour of those shown herein—whether it be the front or the rear ends of such side frame members—and a strong and efficient connection will be afforded between the bumper and the side frame members.

Having thus described my invention, what I claim is:

1. The combination, with the end portion of the side member of a vehicle, of a bracket comprising a base plate adapted to bear against the top of such end portion means for securing such base plate to the top of such end portion, the bracket having a longitudinal extension provided with an inverted U-shaped channel extending in the direction of the length of the side member, and a bumper supporting arm fitted within said channel and secured to said extension.

2. The combination, with the downwardly curved end of the side member of a vehicle, of a bracket comprising a base plate adapted to bear against the top of such curved end of the side member, and means for securing such base plate to the top of such curved end of the side member, the bracket having a longitudinal extension provided with a U-shaped channel extending in the direction of the length of the side member, and a bumper supporting arm fitted within said channel and secured to said extension.

3. The combination, with the downwardly curved end of a vehicle frame member, of a bracket having a base plate adapted to bear against the curved top of said member, a U-bolt securing the bracket to the said member, the said bracket having a longitudinal extension provided with an inverted U-shaped seat, an arm within said seat, and means for securing said arm within said seat, said means including countersunk apertures in the said seat and securing means mounted in said apertures and extending through said arm.

4. The combination, with a vehicle frame member, of a bracket, means securing the said bracket to the said member, the said bracket having a longitudinal extension provided with a channeled seat, an arm within said seat, and means for securing said arm within said seat, said means including countersunk apertures in the said seat formed by pressing the opposite sides of said seat inwardly, and securing means mounted in said apertures and extending through said arm.

In testimony whereof, I hereunto affix my signature.

WAYNE E. DUNSTON.